US011887559B1

(12) United States Patent
Nam et al.

(10) Patent No.: US 11,887,559 B1
(45) Date of Patent: Jan. 30, 2024

(54) DRIVING INSTRUCTION MODIFICATION METHOD AND RECEIVER APPLIED TO DISPLAY DRIVER INTEGRATED CIRCUIT

(71) Applicant: Beijing ESWIN Computing Technology Co., Ltd., Beijing (CN)

(72) Inventors: Kevin Nam, Beijing (CN); Rion Lee, Beijing (CN); Daniel Ji, Beijing (CN)

(73) Assignee: Beijing ESWIN Computing Technology Co., Ltd., Beijing (CN)

( * ) Notice: Subject to any disclaimer, the term of this patent is extended or adjusted under 35 U.S.C. 154(b) by 0 days.

(21) Appl. No.: 18/146,443

(22) Filed: Dec. 26, 2022

(30) Foreign Application Priority Data

Aug. 11, 2022 (CN) ........................ 202210962837.9

(51) Int. Cl.
*G09G 5/00* (2006.01)

(52) U.S. Cl.
CPC ..... *G09G 5/006* (2013.01); *G09G 2310/0264* (2013.01); *G09G 2320/06* (2013.01); *G09G 2370/08* (2013.01)

(58) Field of Classification Search
CPC ...................................................... G09G 5/006
See application file for complete search history.

(56) References Cited

U.S. PATENT DOCUMENTS

2019/0304379 A1* 10/2019 Pytlarz ................. G09G 3/3406

FOREIGN PATENT DOCUMENTS

CN 111243540 A 6/2020
CN 114091399 B 4/2022

* cited by examiner

*Primary Examiner* — Gustavo Polo

(57) ABSTRACT

The present application discloses a driving instruction modification method and a receiver applied to a display driver integrated circuit, and relates to the technical field of display integrated circuits, and the main purpose thereof is to normally apply a set global parameter to a driving instruction to be modified even if there is an interference command after setting the global parameter; the main technical solution includes: judging whether a target command received after setting a global parameter satisfies an initialization condition; if so, after modifying a driving instruction corresponding to the target command based on the target command and the global parameter, initializing the global parameter; otherwise, maintaining the global parameters unchanged.

18 Claims, 2 Drawing Sheets

DRIVING INSTRUCTION MODIFICATION METHOD AND RECEIVER APPLIED TO DISPLAY DRIVER INTEGRATED CIRCUIT

CROSS REFERENCE TO RELATED APPLICATION

This application claims priority to Chinese Patent Application No. CN2022109628379, titled "Driving Instruction Modification Method and Receiver Applied To Display Driver Integrated Circuit" and filed to the State Patent Intellectual Property Office on the entire contents of which are incorporated herein by reference.

TECHNICAL FIELD

The present application relates to the field of display integrated circuits, and more particularly, to a driving instruction modification method and a receiver applied to a display driver integrated circuit.

BACKGROUND ART

DDIC (display driver integrated circuit) is an integrated circuit for driving a display module such as LCD (liquid crystal display), LED (light emitting diode) and OLED (organic light emitting diode). The display driver integrated circuit is used for receiving image data and driving instructions sent by an AP (application processor) and driving the display module to perform display output according to the received image data and driving instructions.

The driving instruction transmitted by the application processor to the display driver integrated circuit is one of the important data required for the display driver integrated circuit to perform the display driving, which usually includes tens or hundreds of parameters. In order to enable the driving instruction to meet the display requirements, the display driver integrated circuit needs to modify the parameter values of some of the parameters in the driving instruction after receiving the driving instruction. Currently, global parameters are often employed to modify parameter values of parameters within a driving instruction. Although the parameter value of a specified parameter in the driving instruction can be quickly modified by the global parameter, the image data and the driving instruction sent by the application processor to the display driver integrated circuit are asynchronously transmitted through different processes, and therefore an interference command occurs after setting the global parameter for modification of the driving instruction to be modified, resulting in the phenomenon that the set global parameter cannot be applied to the driving instruction to be modified.

SUMMARY OF THE INVENTION

In view of this, the present application proposes a driving instruction modification method and a receiver applied to a display driver integrated circuit, the main purpose of which is to normally use a set global parameter to a driving instruction to be modified even if there is an interference command after setting the global parameter.

In order to achieve the above-mentioned object, the present application mainly provides the following technical solutions.

In a first aspect, the present application provides a driving instruction modification method applied to a receiver in a display driver integrated circuit, the driving instruction modification method comprising:

judging whether a target command received after setting a global parameter satisfies an initialization condition;

if so, after modifying a driving instruction corresponding to the target command based on the target command and the global parameter, initializing the global parameter;

otherwise, maintaining the global parameter unchanged.

In some embodiments, judging whether a target command received after setting a global parameter satisfies an initialization condition comprises: after the global parameter is set, every time a target command is received, judging whether the target command is a command for modifying the driving instruction; if so, determining that the target command satisfies the initialization condition; if not, determining that the target command does not satisfy the initialization condition.

In some embodiments, after determining that the target command is a command to modify the driving instruction, prior to determining that the target command satisfies the initialization condition, the method comprises: judging whether a command corresponding to the target command is included in a preset first command; if not, determining that the target command satisfies the initialization condition; if so, determining that the target command does not satisfy the initialization condition.

In some embodiments, judging whether a target command received after setting a global parameter satisfies an initialization condition comprises: judging whether the instruction of applying a last set global parameter and the instruction corresponding to the target command are the same driving instruction; if not, determining that the target command does not satisfy the initialization condition; if so, determining that the target command satisfies the initialization condition.

In some embodiments, judging whether a target command received after setting a global parameter satisfies an initialization condition comprises: after the global parameter is set, every time a target command is received, judging whether a command corresponding to the target command is included in a preset second instruction; if so, determining that the target command does not satisfy the initialization condition; if not, determining that the target command satisfies the initialization condition.

In some embodiments, judging whether a target command received after setting a global parameter satisfies an initialization condition comprises: after the global parameter is set, every time a target command is received, judging whether a command corresponding to the target command is included in a preset third instruction; if not, determining that the target command does not satisfy the initialization condition; if so, detecting whether a command corresponding to the target command is the last instruction in the preset third instruction to use the global parameter; if it is the last one, determining that the target command satisfies the initialization condition; if not, determining that the target command does not satisfy the initialization condition.

In some embodiments, modifying a driving instruction corresponding to the target command based on the target command and the global parameter comprises: when the target command is a command for modifying the driving instruction, determining a parameter to be modified in the driving instruction corresponding to the target command based on a newly set global parameter; modifying a parameter value of the parameter to be modified into a target parameter value carried by the target command; and the instruction for modifying the driving instruction being used for determining a target parameter value for modifying the driving instruction to be modified.

In some embodiments, prior to judging whether a target command received after setting a global parameter satisfies an initialization condition, the method further comprises: setting the global parameter based on a target parameter carried by a set command, the target parameter being a parameter of a parameter value to be modified in a driving instruction.

In some embodiments, initializing the global parameter comprises: initializing the global parameter to be a preset parameter.

In some embodiments, after modifying a driving instruction corresponding to the target command based on the target command and the global parameter, the method further comprises: detecting whether all the parameters required to be modified in the driving instruction are modified; if so, transmitting the modified driving instruction.

In some embodiments, the method further comprises: in the case where it is detected that the parameter required to be modified in the driving instruction still has an unmodified parameter, setting a new global parameter after initializing the global parameter, the initialized global parameter and the newly set global parameter being respectively used for determining a parameter required to be modified in the same driving instruction, and the parameters required to be modified determined by both the initialized global parameter and the newly set global parameter being different.

In a second aspect, the present application provides a receiver applied to a display driver integrated circuit, the receiver using the driving instruction modification method of the first aspect.

In a third aspect, the present application provides a display driver integrated circuit comprising the receiver applied to a display driver integrated circuit of the second aspect.

With the above-mentioned technical solution, the driving instruction modification method and the receiver applied to a display driver integrated circuit provided in the present application judge whether a target command received after setting a global parameter satisfies an initialization condition. If the received target command satisfies an initialization condition, a global parameter is initialized after modifying a driving instruction corresponding to the target command based on the target command and the set global parameter. If the received target command does not satisfy the initialization condition, the global parameter is maintained unchanged. It can be seen that in the solution provided in the present application, only in the case where the target command received after setting a global parameter satisfies the initialization condition, the global parameter is initialized after the driving instruction corresponding to the target command is modified based on the target command and the set global parameter. However, in the case where the target command received after setting the global parameter does not satisfy the initialization condition, the global parameter is not initialized, but the set global parameter is maintained unchanged. Therefore, the solution provided by the present application can normally apply the set global parameter to the driving instruction to be modified even if an interference command occurs after setting the global parameter.

The above-mentioned description is merely an overview of the technical solution of the present application, which can be implemented according to the contents of the description in order to enable the technical means of the present application to be more clearly understood, and in order to enable the above-mentioned and other objects, features and advantages of the present application to be more clearly understood, particular embodiments of the present application are set forth below.

BRIEF DESCRIPTION OF THE DRAWINGS

In order to explain the embodiments of the present application or the technical solutions in the prior art more clearly, the following will briefly introduce the drawings which need to be used in the embodiments or the description of the prior art. Obviously, the drawings in the following description are some embodiments of the present application, and it would have been possible for a person of ordinary skill in the art to obtain other drawings according to these drawings without involving any inventive effort.

DETAILED DESCRIPTION OF THE INVENTION

Exemplary embodiments of the present disclosure will be described in more detail below with reference to the accompanying drawings. While the drawings show exemplary embodiments of the present disclosure, it should be understood that the present disclosure may be embodied in various forms and should not be construed as limited to the embodiments set forth herein. Rather, these embodiments are provided so that this disclosure will be thorough and complete, and will fully convey the scope of the disclosure to those skilled in the art.

DDICv is an integrated circuit used for driving a display module such as LCD, LED and OLED. The display driver integrated circuit is used for receiving image data and a driving instruction sent by the AP, and driving the display module to display according to the received image data and driving instructions.

Figure 1:
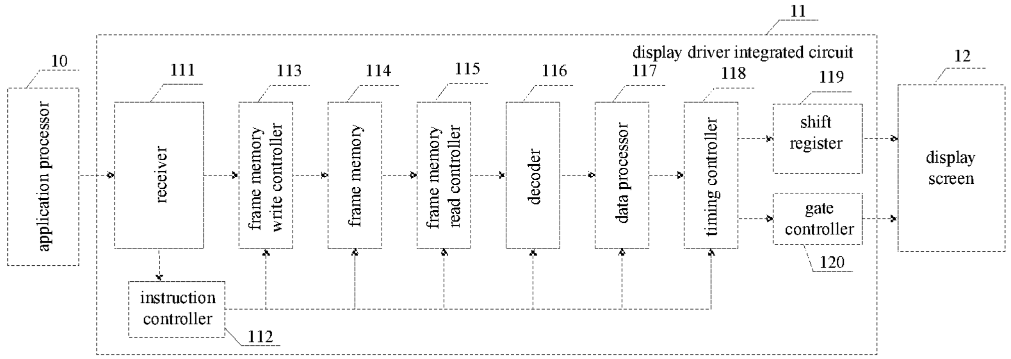
FIG. 1 shows a schematic diagram of a display driver integrated circuit provided by one embodiment of the present application.

The structure of the display driver integrated circuit is specifically described below with reference to FIG. 1 as an example: included in FIG. 1 are a application processor 10, a display driver integrated circuit 11, and a display screen 12. The display driver integrated circuit 11 includes a receiver 111, an instruction controller 112, a frame memory write controller 113, a frame memory 114, a frame memory read controller 115, a decoder 116, a data processor 117, a timing controller 118, a shift register 119, and a gate controller 120. The application processor 10 transmits image data and driving instructions to the receiver 111. The receiver 111 receives image data and driving instructions through an MIPI (mobile industry processor interface). The instruction controller 112 processes the driving instruction received by the receiver 111. Based on the received driving instruction, the instruction controller 112 sends a corresponding driving instruction to each component in the display driver integrated circuit, and each component in the display driver integrated circuit executes the following actions under the received driving instruction: the frame memory write controller 113 writes the image data received by the receiver 111 into the frame memory 114. The frame memory 114 stores the written image data. The frame memory read controller 115 reads image data corresponding to a row address of a pixel row to be displayed from the frame memory 114 based on the row address, and transmits the read image data to the decoder 116. The decoder 116 performs decoding on the received image data, and transmits the decoded image data to the data processor 117. The data processor 117 compensates and corrects the decoded image data, and transmits the compensated and corrected image data to the timing controller 118. The timing controller 118 transmits the image data to the shift register 119, and in addition, the timing controller 118 is used for providing a synchronization signal and a clock signal for each component in the display driver integrated circuit, and generating a TE signal, i.e. an interrupt signal, so that the AP can synchronously transmit the image data. The shift register 119 sequentially shifts the image data transmitted by the timing controller 118, and under the action of the gate controller 120, the image data output by the shift register 119 is finally transmitted to the display screen 12, so that the display screen 12 is displayed based on the image data.

Figure 2:
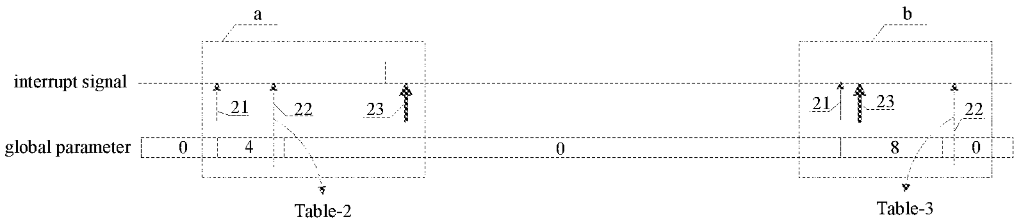
FIG. 2 shows a schematic diagram of a global parameter applied to a driving instruction provided by one embodiment of the present application.

The driving instruction transmitted by the application processor to the display driver integrated circuit is one of the important data required for the display driver integrated circuit to perform the display driving, which usually includes tens or hundreds of parameters. In order to enable the driving instruction to meet the display requirements, the display driver integrated circuit needs to modify the parameter values of some parameters in the driving instruction after receiving the driving instruction, and the modification process of the driving instruction described herein can be performed by the receiver 111 in the display driver integrated circuit. Currently, global parameters are often employed to modify parameter values of parameters within a driving instruction. Although the parameter value of a specified parameter in the driving instruction can be quickly modified by the global parameter, the image data and the driving instruction sent by the application processor to the display driver integrated circuit are asynchronously transmitted through different processes, and therefore an interference command occurs after setting the global parameter for modification of the driving instruction to be modified, resulting in the phenomenon that the set global parameter cannot be applied to the driving instruction to be modified. Illustratively, as shown in FIG. 2, FIG. 2 is a schematic diagram of a global parameter applied to a driving instruction. The driving instruction shown in Table-1 is a driving instruction to be modified. Table-1 shows that the instruction name of the driving instruction is B3h, the driving instruction B3h comprises 10 parameters of 0-9, and the parameter values corresponding to the 10 parameters of 0-9 are all ooh.

A region a in FIG. 2 is described below. A set command for setting the global parameter is indicated by 21 in the a region, a command for modifying the driving instruction is indicated by 22, and an image update command is indicated by 23. The command 22 for modifying a driving instruction is used for determining a driving instruction to be modified and determining a target parameter value used for modifying the driving instruction to be modified. For example, if the command 22 carries AAh and B3h, it indicates that the driving instruction to be modified is B3h and the target parameter value used for modifying B3h is AAh. After the set command 21 is acquired, the global parameter is set to 4 based on the set command 21, and the global parameter of 4 defines that the parameter required to modify the parameter value in the driving instruction is 4. It can be seen from region a in FIG. 2 that there is no other instruction interference between the set command 21 and the command 22 for modifying the driving instruction, and therefore, the set global parameter 4 can be applied to the driving instruction B3h, and therefore the parameter value of the parameter 4 in the driving instruction B3h is modified to be AAh, and the modified driving instruction is as shown in table-2. It can be seen that, for the region a, since there is no interference of other commands after setting the global parameter and within a period of time when no command for modifying the driving instruction is received, the set global parameter can be applied to the driving instruction to be modified.

The following describes the region b in FIG. 2. A set command to set a global parameter is indicated by 21 in the region b, a command to modify the driving instruction is indicated by 22, and an image update command is indicated by 23. The command 22 for modifying a driving instruction is used for determining a driving instruction to be modified and determining a target parameter value used for modifying the driving instruction to be modified. For example, if the command 22 carries AAh and B3h, it indicates that the driving instruction to be modified is B3h and the target parameter value used for modifying B3h is AAh. After the set command 21 is acquired, the global parameter is set to 8 based on the set command 21, and the global parameter of 8 defines that the parameter required to modify the parameter value in the driving instruction is 8. It can be seen from region b in FIG. 2 that there is interference of the image update command 23 between the set command 21 and the command to modify the driving instruction 22, resulting in the global parameter being initialized from 8 to 0. Upon receiving the command 22 to modify the driving instruction, since the global parameter has been initialized to 0, the initialized global parameter 0 is applied in the driving instruction, causing no modification requirement in the driving instruction B3h is modified, while the parameter 8 desired to be modified is not modified. After global parameter 0 is applied in the driving instruction, the resulting driving instruction is as shown in Table-3, and the parameter value of parameter 0 in driving instruction B3h in Table-3 is modified as AAh. It can be seen that the set global parameter is not normally applied to the driving instruction to be modified due to interference of the other instruction "image update command 23" in the region b after setting the global parameter and within the time period when the command 22 for modifying the driving instruction is not received.

TABLE-1

| Instruction name | Parameter sequence number | Parameter value |
|---|---|---|
| B3h | 0 | 00h |
| | 1 | 00h |
| | 2 | 00h |
| | 3 | 00h |
| | 4 | 00h |
| | 5 | 00h |
| | 6 | 00h |
| | 7 | 00h |

TABLE-1-continued

| Instruction name | Parameter sequence number | Parameter value |
|---|---|---|
| | 8 | 00h |
| | 9 | 00h |

TABLE-2

| Instruction name | Parameter sequence number | Parameter value |
|---|---|---|
| B3h | 0 | 00h |
| | 1 | 00h |
| | 2 | 00h |
| | 3 | 00h |
| | 4 | AAh |
| | 5 | 00h |
| | 6 | 00h |
| | 7 | 00h |
| | 8 | 00h |
| | 9 | 00h |

TABLE-3

| Instruction name | Parameter sequence number | Parameter value |
|---|---|---|
| B3h | 0 | AAh |
| | 1 | 00h |
| | 2 | 00h |
| | 3 | 00h |
| | 4 | AAh |
| | 5 | 00h |
| | 6 | 00h |
| | 7 | 00h |
| | 8 | 00h |
| | 9 | 00h |

In order to solve the above-mentioned defect, embodiments of the present application provide a driving instruction modification method and a receiver applied to a display driver integrated circuit. The embodiments of the present application provide a driving instruction modification method and a receiver applied to a display driver integrated circuit, which can normally apply a set global parameter to a driving instruction to be modified even after setting the global parameter and in the presence of interference of other commands within a time period when no command for modifying the driving instruction to be modified is received.

Figure 3:
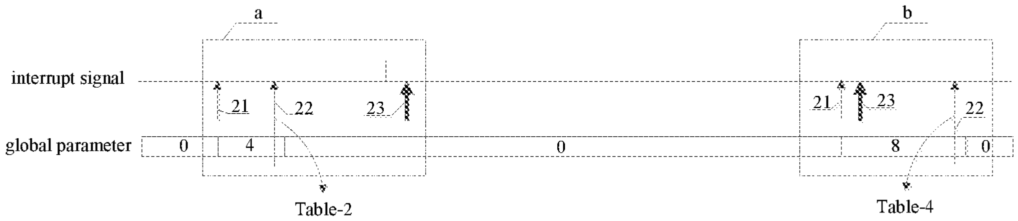
FIG. 3 shows a schematic diagram of a global parameter applied to a driving instruction after using a driving instruction modification method provided by one embodiment of the present application.

Illustratively, as shown in FIG. 3, FIG. 3 is a diagram illustrating the application of global parameters to a driving instruction after applying the driving instruction modification method provided by an embodiment of the present application. The driving instruction to be modified is the driving instruction shown in Table-1.

The region a in FIG. 3 is substantially the same as the region a in FIG. 2, and therefore will not be described in detail here. The following describes the region b in FIG. 3. A set command to set a global parameter is indicated by 21 in the region b, a command to modify a driving instruction is indicated by 22, and an image update command is indicated by 23. The command 22 for modifying a driving instruction is used for determining a driving instruction to be modified and determining a target parameter value used for modifying the driving instruction to be modified. For example, if the command 22 carries AAh and B3h, it indicates that the driving instruction to be modified is B3h and the target parameter value used for modifying B3h is AAh. After the set command 21 is acquired, the global parameter is set to 8 based on the set command 21, and the global parameter of 8 defines that the parameter required to modify the parameter value in the driving instruction is 8. As can be seen from FIG. 3, there is a disturbance of the "image update command" after setting the global parameter 8 and during the time period when the command 22 for modifying the driving instruction to be modified is not received. However, since the driving instruction modification method and the receiver applied to the display driver integrated circuit provided by the embodiment of the present application are applied, in the case where there is interference of the image update command 23 between the set command 21 and the command 22 for modifying the driving instruction, the global parameter is not initialized to 0 and remains unchanged as 8. Upon receiving the command 22 to modify the driving instruction, the set global parameter 8 can be applied in the driving instruction B3h. After global parameter 8 is applied to driving instruction B for 3 h, the global parameter is initialized to zero. The driving instruction according to the command 22 for modifying the driving instruction is shown in Table-4. As can be seen from Table-4, since the driving instruction modification method and the receiver applied to the display driver integrated circuit provided by the embodiment of the present application are applied, even if there is interference of the image update command 23 between the set command 21 and the command 22 for modifying the driving instruction, the set global parameter 8 is still applied in the driving instruction when the command 22 for modifying the driving instruction is received. It can be seen that the driving instruction modification method and the receiver applied to the display driver integrated circuit provided by the embodiments of the present application can normally apply the set global parameter to the driving instruction to be modified even after the global parameter is set and there is interference of other commands within the time period when the instruction for modifying the driving instruction to be modified is not received. In addition, it should be noted that the TE signal, which is the interrupt signal in FIGS. 2 and 3, is an example to describe the sequential relationship of the acquisition time among the set command 21, the command 22 to modify the driving instruction, and the image update command 23.

TABLE-4

| Instruction name | Parameter sequence number | Parameter value |
|---|---|---|
| B3h | 0 | 00h |
| | 1 | 00h |
| | 2 | 00h |
| | 3 | 00h |
| | 4 | AAh |
| | 5 | 00h |
| | 6 | 00h |
| | 7 | 00h |
| | 8 | AAh |
| | 9 | 00h |

The driving instruction modification method provided by the embodiment of the present application is applied to a display driver integrated circuit, and is particularly applicable to a receiver in a display driver integrated circuit, i.e. the receiver 111 shown in FIG. 1. Hereinafter, a driving instruction modification method and a receiver applied to a display driver integrated circuit according to an embodiment of the present application will be described in detail.

Figure 4:
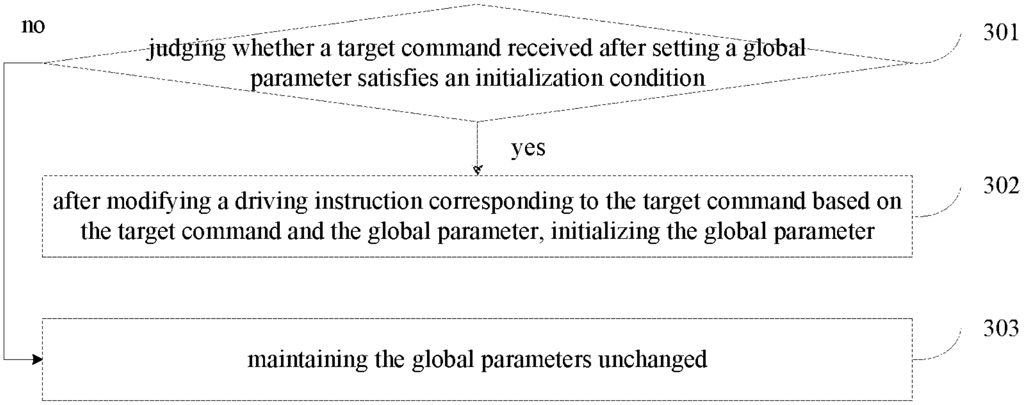
FIG. 4 is a flow chart illustrating a driving instruction modification method provided by one embodiment of the present application.

As shown in FIG. 4, an embodiment of the present application provides a driving instruction modification method applied to a receiver in a display driver integrated circuit. The driving instruction modification method mainly comprises the following steps:

301, judging whether a target command received after setting a global parameter satisfies an initialization condition; if so, executing step 302; otherwise, performing step 303.

The receiver in the display driver integrated circuit is responsible for the modification of the driving instruction, and therefore the driving instruction modification method provided by the embodiments of the present application is applied to the receiver in the display driver integrated circuit.

The driving instruction received by the receiver includes a large number of parameters, and parameter values of some of the parameters in the driving instruction need to be modified in order to meet display requirements. If the global parameter modification driving instruction is not used, no matter where the parameter required to modify the parameter value is located in the driving instruction, it is necessary to perform parameter value modification on all the parameters starting from the first parameter in the driving instruction in turn, only the parameter value of the parameter without modification requirement is modified to its original value, and the parameter value of the parameter with modification requirement is modified to the value satisfying the modification requirement. Such modification requires a large amount of computational effort and is inefficient. The embodiment of the present application uses a global parameter modification driving instruction, and a parameter requiring to modify a parameter value in a driving instruction can be locked by a set global parameter, and the parameter value of the locked parameter is directly modified, and the whole modification is only performed on the parameter required to modify the parameter value, which is independent of the parameter requiring no modification, and therefore the calculation effort is less and the modification efficiency is higher.

The modification of the driving instruction needs to be done based on the global parameters, so the global parameters need to be set before step 301. The setting process of the global parameter is specifically: setting a global parameter based on a target parameter carried by a set command, wherein the target parameter is a parameter of a parameter value to be modified in a driving instruction.

The set command carries a target parameter, and the target parameter is a parameter required to modify a parameter value in a driving instruction to be modified. When the set command is acquired, the global parameter is set as the target parameter, and the set global parameter is taken as the newly set global parameter so as to modify the driving instruction based on the newly set global parameter. Specific type of the set command is not particularly limited in the present embodiment, and illustratively the set instruction uses a command of type B0.

Illustratively, as shown in FIG. 2, for the region a, if the target parameter carried in the set command 21 is 4, the global parameter is set to 4.

After setting the global parameter, it is necessary to judge whether the target command received after setting the global parameter satisfies the initialization condition. The specific implementation solution for judging whether a target command received after setting a global parameter satisfies an initialization condition comprises the following.

Firstly, the specific process of judging whether a target command received after setting a global parameter satisfies an initialization condition comprises: after the global parameter is set, every time a target command is received, judging whether the target command is a command for modifying a driving instruction; if yes, determining that the target command satisfies the initialization condition; if not, determining that the target command does not satisfy the initialization condition.

The image data and the driving instruction sent by the application processor to the display driver integrated circuit are transmitted asynchronously through different processes, so that a command such as an image update command may occur in addition to a command to modify the driving instruction after the global parameter is set. The presence of a command such as an image update command causes the global parameter set to be initialized without being applied to the driving instruction to be modified. Therefore, in order to avoid that the global parameter is initialized before being applied to the driving instruction to be modified, it is necessary to judge whether the target command is a command for modifying the driving instruction after the global parameter is set every time a target command is received.

When it is determined that the target command is not a command for modifying a driving instruction, it is stated that the target command has a high probability of being an interference command such as an image update command; and in order to ensure that the set global parameter can be applied to the driving instruction to be modified, the interference of the target command is ignored, and it is determined that the target command does not satisfy the initialization condition. When it is determined that the target command is a command for modifying a driving instruction, it is stated that the driving instruction corresponding to the target command can use the set global parameter, and therefore it is determined that the target command satisfies an initialization condition, so as to initialize the global parameter after modifying the driving instruction corresponding to the target command based on the target command and the set global parameter. In order to ensure that all the driving instructions requiring parameter modification using the set global parameter can be applied to the set global parameter, after determining that the target command is a command for modifying the driving instruction, before determining that the target command satisfies the initialization condition, the following steps can also be executed: judging whether a command corresponding to the target command is included in a preset first command; if not, determining that the target command satisfies the initialization condition; if so, determining that the target command does not satisfy the initialization condition.

The first command is a driving instruction, and a corresponding command to modify the driving instruction is issued in a target time period, wherein the target time period is a period of time after the global parameter is set and a command to modify the driving instruction to be modified is not received. In addition, it should be noted that in the case where a command to modify a driving instruction corresponding to a first command is received within a target time period, whether to modify the first command based on the instruction to modify the driving instruction and the set global parameter may be determined based on service requirements, and the present embodiment is not particularly limited.

When it is determined that the instruction corresponding to the target command is included in the preset first command, it is indicated that the target command for the driving instruction to be modified has not been received, and the set global parameter has not been applied to the driving instruction to be modified, and therefore it is determined that the target command does not satisfy the initialization condition.

When it is determined that the instruction corresponding to the target command is not included in the preset first command, it is stated that the target command has a high probability of being a target command for a driving instruction to be modified, and therefore it is determined that the target command satisfies the initialization condition so as to initialize a global parameter after modifying the driving instruction corresponding to the target command based on the target command and the set global parameter.

Secondly, the specific process of judging whether a target command received after setting a global parameter satisfies an initialization condition comprises: after the global parameter is set, every time a target command is received, judging whether a command corresponding to the target command is included in a preset second instruction; if yes, determining that the target command does not satisfy the initialization condition; if not, determining that the target command satisfies the initialization condition.

Which instruction is specifically selected as the second instruction is not specifically limited in the present embodiment, and may be determined based on specific business requirements. A command corresponding to a second instruction may result in that the global parameter cannot be applied to the driving instruction to be modified, and the method for selecting the second instruction is selecting a command having an issuing time point occurring within a target time period, and determining a command corresponding to the selected command as a second instruction. The target time period is a period of time after the global parameter is set and a command to modify the driving instruction to be modified is not received. The instructions that occur within the target time period at the issuing time point are a command to modify a driving instruction and an image update command. The corresponding issuing time point is the time point at which the instruction to modify the driving instruction is issued and the time point at which the image update command is issued. a command with the issuing time point occurring within the target time period is issued with a large probability, after the global parameter is set, and within the time period when the instruction for modifying the driving instruction to be modified is not received, a disturbance is generated, which causes the set global parameter to be initialized, thereby causing the set global parameter not to be normally applied to the driving instruction to be modified, and therefore a command with the issuing time point of the instruction occurring within the target time period is selected as a second instruction.

If it is judged that the instruction corresponding to the target command is included in the preset second instruction, it is indicated that the target command is an interference command; and in order to ensure that the set global parameter can be normally applied to the driving instruction to be modified, it is determined that the target command does not satisfy the initialization condition so as to maintain the set global parameter unchanged.

If it is judged that a command corresponding to a target command does not comprise a preset second instruction, it is stated that the instruction corresponding to the target command is a driving instruction to be modified; and in order to ensure that the set global parameter can be normally applied to the driving instruction to be modified, it is determined that the received target command satisfies the initialization condition so as to initialize the global parameter after modifying the driving instruction corresponding to the target command based on the target command and the set global parameter. The global parameter continues to be set for the next driving instruction to be modified based on the initialized global parameter.

Figure 5:
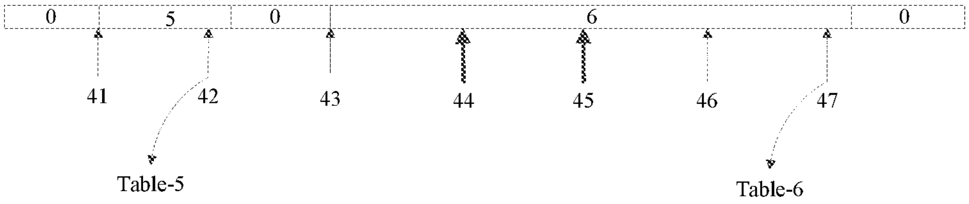
FIG. 5 shows a schematic diagram of a global parameter applied to a driving instruction provided by another embodiment of the present application.

Illustratively, as shown in FIG. 5, commands 41 through 47 are included in FIG. 5. Command 41 is a set instruction that requires setting the global parameter to 5. Command 42 is a command to modify the driving instruction, which requires modifying the parameter value of the parameter to be modified in driving instruction B3h to AAh. Command 43 is a set instruction that requires setting the global parameter to 6. Command 44 is an image update command that requires image data to be written in accordance with instruction 2Ch. Command 45 is an image update command that requires writing image data according to instruction 3Ch. Command 46 is a command to modify a driving instruction that requires modifying the parameter value of the parameter to be modified in driving instruction 5Ch to AAh. Command 47 is a command to modify the driving instruction, which requires modifying the parameter value of the parameter to be modified in driving instruction B3h to AAh. The parameters and parameter values in the driving instruction B3h are shown in Table-1. The preset first instructions include 2Ch, 3Ch and 5Ch. The B3h, 2Ch, 3Ch and 5Ch described herein are instructions included in the MIPI standard. FIG. 5 is described below in order of acquisition of commands 41 to 47: upon receiving the instruction 41, the global parameter is set to 5. After setting the global parameter 5, the command 42 is received, and there is no interference of other instructions between the instruction 41 and the command 42, then the parameter value of the parameter 5 in the driving instruction B3h shown in table-1 is modified from 00h to AAh according to the command 42 and the set global parameter 5, so as to obtain the driving instruction as shown in table-5. After modifying the driving instruction B3h corresponding to the command 42 based on the command 42 and the set global parameter 5, the global parameter is initialized to 0, and then the command 43 is received, and the global parameter is set to 6 according to the command 43. After setting the global parameter to 6, commands 44, 45 and 46 are received in sequence. It is successively judged that the received commands 44, 45 and 46 are all included in a preset second instruction; the commands 44, 45 and 46 are all interference commands; and in order to ensure that the set global parameter can be normally applied to a driving instruction to be modified, the set global parameter 6 is maintained unchanged after the instruction 44 is received, after the instruction 45 is received and after the command 46 is received. Subsequently, a command 47 is received, the command 47 being a command to modify the driving instruction, which requires the parameter value of the parameter to be modified in the driving instruction B3h to be modified to be AAh. Then, according to the command 47 and the set global parameter 6, the parameter value of the parameter 6 in the driving instruction B3h shown in table-5 is modified from 00h to AAh, resulting in the driving instruction shown in table-6.

TABLE-5

| Instruction name | Parameter sequence number | Parameter value |
|---|---|---|
| B3h | 0 | 00h |
| | 1 | 00h |
| | 2 | 00h |
| | 3 | 00h |
| | 4 | 00h |
| | 5 | AAh |
| | 6 | 00h |

TABLE-5-continued

| Instruction name | Parameter sequence number | Parameter value |
|---|---|---|
| | 7 | 00h |
| | 8 | 00h |
| | 9 | 00h |

TABLE-6

| Instruction name | Parameter sequence number | Parameter value |
|---|---|---|
| B3h | 0 | 00h |
| | 1 | 00h |
| | 2 | 00h |
| | 3 | 00h |
| | 4 | 00h |
| | 5 | AAh |
| | 6 | AAh |
| | 7 | 00h |
| | 8 | 00h |
| | 9 | 00h |

In addition, after receiving the command 46, although it is determined that it is an interference command based on a preset second instruction, the instruction itself is also a command for modifying a driving instruction, and therefore a parameter value corresponding to the parameter 6 in the instruction 5Ch corresponding to the command 46 can also be modified to be AAh according to the information carried by the command 46.

Thirdly, the specific process of judging whether the target command received after setting the global parameter satisfies the initialization condition comprises: after the global parameter is set, every time a target command is received, judging whether a command corresponding to the target command is included in a preset third instruction; if not, determining that the target command does not satisfy the initialization condition; if so, detecting whether a command corresponding to a target command is a last instruction of applying a global parameter in a preset third instruction, and if so, determining that the target command satisfies the initialization condition; if not, determining that the target command does not satisfy the initialization condition.

The third instruction is a command that needs to use the set global parameter. Which instruction is specifically selected as the third instruction is not specifically limited in the present embodiment, and may be determined based on specific business requirements. The third instruction selection method is when setting a global parameter, determining a command required to use the set global parameter, and selecting the determined instruction as a third instruction. The instruction required to apply the set global parameter is a driving instruction required to perform parameter modification using the set global parameter.

If it is judged that the received target command is included in the preset third instruction, it indicates that the target command is a driving instruction to be modified, and it is necessary to continue to detect whether the instruction corresponding to the received target command is a third instruction of a global parameter set by the last application in the preset third instruction. If the last one is detected, then it is stated that all the driving instructions which need to use the set global parameter can be applied to the set global parameter, and then it is determined that the received target command satisfies the initialization condition so as to initialize the global parameter after modifying the driving instruction corresponding to the target command based on the target command and the set global parameter. If it is detected that it is not the last one, it is indicated that there is a command required to use the set global parameter not being applied to the set global parameter, and it is determined that the received target command does not satisfy the condition for initializing the global parameter; and in order to ensure that the set global parameter can be normally applied to the preset third instruction, it is determined that the received target command does not satisfy the initialization condition so as to maintain the set global parameter unchanged.

Fourth, a specific process of judging whether a target command received after setting a global parameter satisfies the initialization condition comprises: judging whether the instruction of applying the last set global parameter and the instruction corresponding to the target command are the same driving instruction; if not, determining that the target command does not satisfy the initialization condition; if so, determining that the target command satisfies the initialization condition.

For a driving instruction, there may be more than one parameter required to be modified within the driving instruction; therefore, in order to ensure that all the parameters required to be modified in the driving instruction can be modified normally, it is necessary to judge whether the instruction using the last set global parameter and the instruction corresponding to the target command are the same driving instruction.

If it is judged that a command using a set global parameter and a command corresponding to a target command are the same driving instruction, it is indicated that the target command is a command for modifying another parameter in the driving instruction, and therefore it is determined that the target command satisfies the initialization condition so as to initialize the global parameter after modifying the driving instruction corresponding to the target command based on the target command and the set global parameter.

When it is judged that the instruction using the last set global parameter and the instruction corresponding to the target command are not the same driving instruction, it indicates that the instruction for modifying the driving instruction aiming at another parameter in the driving instruction has not been issued, and therefore it is determined that the target command does not satisfy the initialization condition so as to maintain the set global parameter unchanged.

In practical applications, any one of the above-mentioned methods can be selected based on specific service requirements to judge whether a target command received after setting a global parameter satisfies the initialization condition. When it is judged that the target command does not satisfy the initialization condition, it is indicated that the set global parameter has not been applied to the driving instruction to be modified, and therefore, in order to ensure that the driving instruction to be modified can be applied to the set global parameter, step 303 is performed. When it is judged that the target command satisfies the initialization condition, it is indicated that the driving instruction to be modified can use the set global parameter, and step 302 is performed. 302, after modifying the driving instruction corresponding to the target command based on the target command and the global parameter, the global parameter is initialized.

The purpose of initializing the global parameters is to, on the basis of the initialized global parameter, continue to set the global parameter for the next driving instruction to be modified. The precondition for initializing the global parameters is that modification of the operation of the driving instruction corresponding to the target command based on the target command and the global parameter is completed.

The specific process of modifying the driving instruction corresponding to the target command based on the target command and the global parameter comprises: when the target command is a command for modifying a driving instruction, determining a parameter to be modified in the driving instruction corresponding to the target command based on the newly set global parameter; modifying a parameter value of a parameter to be modified into a target parameter value carried in a target command; and the instruction for modifying the driving instruction being used for determining a target parameter value for modifying the driving instruction to be modified.

The command to modify the driving instruction carries a target parameter value for determining the driving instruction to be modified and for determining to modify the driving instruction to be modified. Therefore, when it is determined that the received target command is a command for modifying the driving instruction, a driving instruction corresponding to the target command is determined, and a parameter to be modified in the driving instruction is determined based on the newly set global parameter. Illustratively, as shown in FIG. 5, command 47 is a command to modify a driving instruction that requires modifying the parameter value of the parameter to be modified in driving instruction B3h to AAh. Upon receiving the command 47, the command 47 is determined to be a command for modifying the driving instruction, and the modification unit 322 modifies the parameter value of the parameter 6 in the driving instruction B3h shown in Table-5 from 00h to AAh according to the command 47 and the set global parameter 6, so as to obtain the driving instruction as shown in Table-6.

In addition, it should be noted that, after setting the global parameter, and during the time period when the instruction for modifying the driving instruction to be modified is not received, although it is an interference command, the corresponding instruction may also have a modification requirement, and thus for the target command received during the above-mentioned time period, once it is determined that the received target command is the instruction for modifying the driving instruction, the driving instruction corresponding to the target command is determined, and the parameter to be modified in the driving instruction is determined based on the newly set global parameter. Illustratively, as shown in FIG. 5, after receiving the command 46, although it is determined that the instruction corresponding to the command 46 is an interference command, the instruction itself is also a command for modifying a driving instruction, and therefore according to the information carried by the command 46, the parameter value corresponding to the parameter 6 in the instruction 5Ch corresponding to the command 46 is modified as AAh.

Furthermore, for a driving instruction, there may be more than one parameter required to modify a parameter value, and therefore after modifying a driving instruction corresponding to a target command based on a target command and a global parameter, the following steps may also be comprised: detecting whether all the parameters required to be modified in the driving instruction have been modified; if so, the modified driving instruction is transmitted.

For a driving instruction, there may be more than one parameter for which the parameter value needs to be modified; if there are parameters for which the parameter needs to be modified are not modified, they are provided to the instruction controller in the display driver integrated circuit; the instruction controller may trigger an erroneous control; therefore, it needs to ensure that all the parameters for which the parameter needs to be modified in the driving instruction are modified, and then the driving instruction is provided to the instruction controller. Therefore, after modifying the driving instruction corresponding to the target command based on the target command and the set global parameter, it is detected whether the parameters that need to be modified in the driving instruction are all modified. If it is detected that the modified parameters of the demand modification in the driving instruction are all modified, it indicates that the driving instruction has been modified and can be provided to the instruction controller for the instruction controller to perform the instruction control operation. If it is detected that there are parameters in the driving instruction that need to be modified, it is indicated that the driving instruction is not modified, a new global parameter is set based on the parameters that are not modified, and then the newly set global parameter is used to modify the driving instruction.

The specific method for detecting whether the parameters required to be modified in the driving instruction are all modified completely comprises the following two methods:

a first method, acquiring a parameter list of parameter values to be modified in a driving instruction, and judging whether all the parameters in the parameter list have been modified; if all the modifications are completed, detecting that all the parameters required to be modified in the driving instruction are modified; if there are parameters in the list of parameters that have not been modified, detecting that there are parameters that have not been modified in the parameters that need to be modified in the driving instruction.

second, after receiving any target command for a driving instruction, detecting whether a new target command for a driving instruction is received again within a preset time period; if it is not received again, detecting that all the parameters required to be modified in the driving instruction are modified completely; if it is received again, detecting that among the parameters of the demand modification in the driving instruction, there are parameters that are not modified.

In order to be able to modify a plurality of parameters in one driving instruction, in the case where it is detected that there is a parameter which is not modified and is completed in a parameter which needs to be modified in a driving instruction, a new global parameter is set after initializing the global parameter, wherein the initialized global parameter and the newly set global parameter are respectively used for determining a parameter which needs to be modified in the same driving instruction, and the parameters determined by both the initialized global parameter and the newly set global parameter need to be modified are different.

Illustratively, as shown in FIG. 5, the parameters to be modified in the driving instruction B3h include the parameter 5 and the parameter 6, and in the case where it is detected that there are parameters to be modified in the driving instruction that are not modified, after initializing the global parameter 5 to 0, a new global parameter is set based on the command 43, the newly set global parameter being 6. Upon receiving the command 47, the command 47 is determined to be a command for modifying the driving instruction, and according to the command 47 and the set global parameter 6, the parameter value of the parameter 6 in the driving instruction B3h shown in table-5 is modified from 00h to AAh to obtain the driving instruction as shown in table-6.

After it is determined that the operation of modifying the driving instruction corresponding to the target command based on the target command and the global parameter is completed, it is indicated that the set global parameter has been applied to the driving instruction corresponding to the target command, thus the global parameter is initialized so as to prepare data for setting the global parameter for the next driving instruction to be modified. The specific execution process of initializing the global parameter is initializing global parameters to preset parameters. The preset parameters may be determined based on service requirements, and the present embodiment is not particularly limited. Illustratively, the preset parameter is 0.

303, maintaining global parameters unchanged.

In the case where the target command received after setting the global parameter does not satisfy the condition for initializing the global parameter, it is indicated that the set global parameter has not been applied to the driving instruction to be modified, so in order to ensure that the set global parameter can be normally applied to the driving instruction to be modified, the global parameter is maintained unchanged.

A driving instruction modification method provided by an embodiment of the present application judges whether a target command received after setting a global parameter satisfies an initialization condition. If the received target command satisfies an initialization condition, the global parameter is initialized after modifying a driving instruction corresponding to the target command based on the target command and the set global parameter. If the received target command does not satisfy the initialization condition, the global parameters are maintained unchanged. It can be seen that in the solution provided in the present application, only in the case where a target command received after setting a global parameter satisfies the initialization condition, the global parameter is initialized after a driving instruction corresponding to the target command is modified based on the target command and the set global parameter. However, in the case where the target command received after setting the global parameter does not satisfy the initialization condition, the global parameter is not initialized, but the set global parameter is maintained unchanged. Therefore, the solution provided by the present application can normally apply the set global parameter to the driving instruction to be modified even if an interference command occurs after setting the global parameter.

Further, according to the driving instruction modification method embodiment described above, another embodiment of the present application also provides a receiver applied to a display driver integrated circuit, the receiver using the driving instruction modification method as described above.

Figure 6:
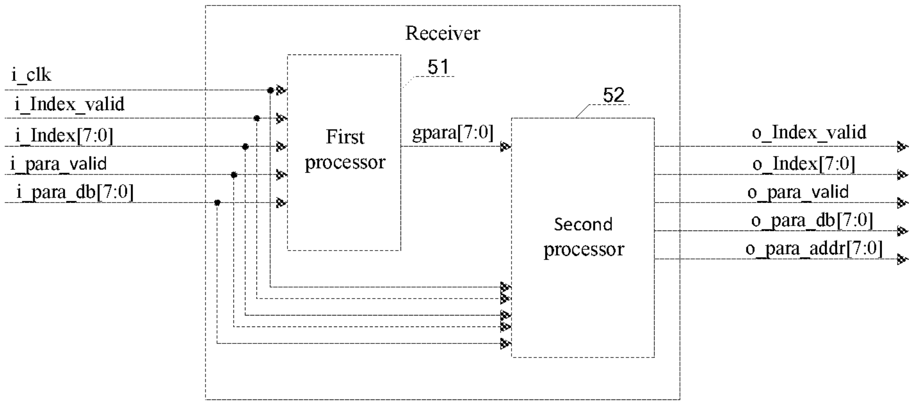
FIG. 6 shows a schematic diagram of an interface involved in a receiver provided by one embodiment of the present application.

As shown in FIG. 6, the interface situation involved in the receiver applying the above-mentioned driving instruction modification method is described below. The interface identified in FIG. 6 is only an example, and can be adjusted and determined according to specific service requirements in practical applications.

It can be seen from FIG. 6 that the receiver comprises a first processor 51 and a second processor 52, and the above-mentioned driving instruction modification method is implemented by the interaction of the first processor 51 and the second processor 52. Both the first processor 51 and the second processor 52 comprise the following interfaces: a clock input interface "i_clk" for clock synchronizing the clocks of each interface; a command input interface "i_Index_valid" for checking the validity of an input instruction name; a command name input interface "i_Index [7:0]" for inputting a name of a driving instruction to be modified, such as B3h; a parameter input interface "i_para_valid" for checking the validity of the parameter values used by the input modify driving instruction; a parameter input interface "i_para_db 7:0" used to input a parameter value, such as AAh, for modifying the driving instruction. The first processor 51 further comprises: a global parameter output interface "gpara 7:0" used to output the newly set global parameter to the second processor 52. The second processor 52 includes the following interfaces: a global parameter input interface "gpara [7:0]" for receiving a global parameter newly set by the first processor 51; a command output interface "o_Index_valid" for checking the validity of an output instruction name; a command name output interface "o_Index [7:0]" for outputting the name of the modified driving instruction; a parameter output interface "o_para_valid" for checking the validity of a parameter value in an output driving instruction; a parameter value output interface "o_para_db [7:0]" for outputting a parameter value used for modification in a driving instruction; a parameter position output interface "o_para_addr [7:0]" used to output the position of the modified parameter in the driving instruction in the driving instruction. Through the above-mentioned interface, the first processor 51 and the second processor 52 can complete the modification of the driving instruction by the global parameter, and in the process of modifying the driving instruction, the set global parameter can be normally applied to the driving instruction to be modified even after the global parameter is set and there is interference of other instructions within the time period when the instruction for modifying the driving instruction to be modified is not received.

Advantageous effects of the embodiments of the present application applied to a receiver of a display driver integrated circuit are described with reference to the advantageous effects of the above-mentioned driving instruction modification method.

Further, another embodiment of the present application also provides a display driver integrated circuit including the receiver applied to the display driver integrated circuit.

The specific structure of the display driver integrated circuit is described above with reference to FIG. 1.

Advantageous effects of the display driver integrated circuit provided by the embodiments of the present application can be seen from the above-mentioned advantageous effects of the receiver applied to the display driver integrated circuit.

In the above-mentioned embodiments, the description of each embodiment has its own emphasis, and reference can be made to the description of other embodiments for portions that are not described in detain in certain embodiment.

It will be understood that relative features of the methods and apparatus described above may be referred to one another. In addition, the terms "first", "second", and the like in the above-described embodiments are used to distinguish the various embodiments and do not represent the advantages or disadvantages of the various embodiments.

It will be clear to a person skilled in the art that, for the convenience and brevity of the description, specific working procedures of the above-described systems, devices and units may be referred to corresponding procedures in the preceding method embodiments and will not be described in detail here.

The algorithms and displays presented herein are not inherently related to any particular computer, virtual system, or other apparatus. Various general purpose systems may also be used with the teachings based herein. The structure required to construct such a system is apparent from the foregoing description. Further, this application is not directed to any particular programming language. It should be understood that the subject matter described herein may be implemented using a variety of programming languages and that the description of specific languages is for the purpose of disclosing the best mode of practicing the subject matter.

In the description provided herein, numerous specific details are set forth. However, it is understood that embodiments of the present application may be practiced without these specific details. In some instances, well-known methods, structures and techniques have not been shown in detail in order not to obscure the understanding of this description.

Moreover, those skilled in the art will appreciate that although some embodiments described herein include some but not other features included in other embodiments, combinations of features of different embodiments are meant to be within the scope of the application and form different embodiments. For example, in the following claims, any one of the claimed embodiments may be used in any combination.

Various component embodiments of the present application may be implemented in hardware, or in a software module running on one or more processors, or in a combination thereof. It will be appreciated by those skilled in the art that a microprocessor or digital signal processor (DSP) may be used in practice to implement some or all of the functions of some or all of the components of the driving instruction modification method according to embodiments of the present application. The application can also be implemented as an apparatus or device program (e.g. a computer program and a computer program product) for performing some or all of the methods described herein. Such a program implementing the present application may be stored on a computer-readable medium, or may be in the form of one or more signals. Such signals may be downloaded from an Internet website, provided on a carrier signal, or provided in any other form. It should be noted that the above-mentioned embodiments illustrate rather than limit the application, and that those skilled in the art will be able to design alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The application can be implemented by means of hardware comprising several distinct elements, and by means of a suitably programmed computer. In the unit claims enumerating several means, several of these means can be embodied by one and the same item of hardware. The use of the words first, second, third, etc. does not denote any order. These words may be interpreted as names.

The invention claimed is:

1. A driving instruction modification method characterized by a receiver applied to a display driver integrated circuit, the method comprising:

judging whether a target command received after setting a global parameter satisfies an initialization condition;

if so, after modifying a driving instruction corresponding to the target command based on the target command and the global parameter, initializing the global parameter;

otherwise, maintaining the global parameter unchanged;

after modifying a driving instruction corresponding to the target command based on the target command and the global parameter, the method further comprises:

detecting whether all the parameters required to be modified in the driving instruction are modified;

if so, transmitting the modified driving instruction;

in the case where it is detected that the parameter required to be modified in the driving instruction still has an unmodified parameter, setting a new global parameter after initializing the global parameter, the initialized global parameter and the newly set global parameter being respectively used for determining a parameter required to be modified in the same driving instruction, and the parameters required to be modified determined by both the initialized global parameter and the newly set global parameter being different.

2. The method according to claim 1, characterized in that judging whether a target command received after setting a global parameter satisfies an initialization condition comprises:

after the global parameter is set, every time a target command is received, judging whether the target command is a command for modifying the driving instruction;

if so, determining that the target command satisfies the initialization condition;

if not, determining that the target command does not satisfy the initialization condition.

3. The method according to claim 2, characterized in that after determining that the target command is a command to modify the driving instruction, prior to determining that the target command satisfies the initialization condition, the method comprises:

judging whether a command corresponding to the target command is included in a preset first command;

if not, determining that the target command satisfies the initialization condition;

if so, determining that the target command does not satisfy the initialization condition.

4. The method according to claim 1, characterized in that judging whether a target command received after setting a global parameter satisfies an initialization condition comprises:

judging whether the instruction of applying a last set global parameter and the instruction corresponding to the target command are the same driving instruction;

if not, determining that the target command does not satisfy the initialization condition;

if so, determining that the target command satisfies the initialization condition.

5. The method according to claim 1, characterized in that judging whether a target command received after setting a global parameter satisfies an initialization condition comprises:

after the global parameter is set, every time a target command is received, judging whether a command corresponding to the target command is included in a preset second instruction;

if so, determining that the target command does not satisfy the initialization condition;

if not, determining that the target command satisfies the initialization condition.

6. The method according to claim 1, characterized in that judging whether a target command received after setting a global parameter satisfies an initialization condition comprises:

after the global parameter is set, every time a target command is received, judging whether a command corresponding to the target command is included in a preset third instruction;

if not, determining that the target command does not satisfy the initialization condition;

if so, detecting whether a command corresponding to the target command is the last instruction in the preset third instruction to use the global parameter; if it is the last one, determining that the target command satisfies the initialization condition; if not, determining that the target command does not satisfy the initialization condition.

7. The method according to claim 1, characterized in that modifying a driving instruction corresponding to the target command based on the target command and the global parameter comprises:

when the target command is a command for modifying the driving instruction, determining a parameter to be modified in the driving instruction corresponding to the target command based on a newly set global parameter; modifying a parameter value of the parameter to be modified into a target parameter value carried by the target command; and the instruction for modifying the driving instruction being used for determining a target parameter value for modifying the driving instruction to be modified.

8. The method according to claim 2, characterized in that modifying a driving instruction corresponding to the target command based on the target command and the global parameter comprises:

when the target command is a command for modifying the driving instruction, determining a parameter to be modified in the driving instruction corresponding to the target command based on a newly set global parameter; modifying a parameter value of the parameter to be modified into a target parameter value carried by the target command; the instruction for modifying the driving instruction being used for determining a target parameter value for modifying the driving instruction to be modified.

9. The method according to claim 4, characterized in that modifying a driving instruction corresponding to the target command based on the target command and the global parameter comprises:

when the target command is a command for modifying the driving instruction, determining a parameter to be modified in the driving instruction corresponding to the target command based on a newly set global parameter; modifying a parameter value of the parameter to be modified into a target parameter value carried by the target command; the instruction for modifying the driving instruction being used for determining a target parameter value for modifying the driving instruction to be modified.

10. The method according to claim 5, characterized in that modifying a driving instruction corresponding to the target command based on the target command and the global parameter comprises:

when the target command is a command for modifying a driving instruction, determining a parameter to be modified in the driving instruction corresponding to the target command based on a newly set global parameter; modifying a parameter value of the parameter to be modified into a target parameter value carried by the target command; the instruction for modifying the driving instruction being used for determining a target parameter value for modifying the driving instruction to be modified.

11. The method according to claim 6, characterized in that modifying a driving instruction corresponding to the target command based on the target command and the global parameter comprises:

when the target command is a command for modifying a driving instruction, determining a parameter to be modified in the driving instruction corresponding to the target command based on a newly set global parameter; modifying a parameter value of the parameter to be modified into a target parameter value carried by the target command; the instruction for modifying the driving instruction being used for determining a target parameter value for modifying the driving instruction to be modified.

12. The method according to claim 1, characterized in that, prior to judging whether a target command received after setting a global parameter satisfies an initialization condition, the method further comprises:

setting the global parameter based on a target parameter carried by a set command, the target parameter being a parameter of a parameter value to be modified in a driving instruction.

13. The method according to claim 2, characterized in that, prior to judging whether a target command received after setting a global parameter satisfies an initialization condition, the method further comprises:

setting the global parameter based on a target parameter carried by a set command, the target parameter being a parameter of a parameter value to be modified in a driving instruction.

14. The method according to claim 4, characterized in that, prior to judging whether a target command received after setting a global parameter satisfies an initialization condition, the method further comprises:

setting the global parameter based on a target parameter carried by a set command, the target parameter being a parameter of a parameter value to be modified in a driving instruction.

15. The method according to claim 5, characterized in that, prior to judging whether a target command received after setting a global parameter satisfies an initialization condition, the method further comprises:

setting the global parameter based on a target parameter carried by a set command, the target parameter being a parameter of a parameter value to be modified in a driving instruction.

16. The method according to claim 1, characterized in that initializing the global parameter comprises:

initializing the global parameter to be a preset parameter.

17. A receiver applied to a display driver integrated circuit, characterized in that the receiver uses the driving instruction modification method according to claim 1.

18. A display driver integrated circuit, characterized by comprising the receiver applied to a display driver integrated circuit as claimed in claim 17.

* * * * *